Patented June 17, 1952

2,601,141

UNITED STATES PATENT OFFICE

2,601,141

AMINO-ARYL-PYRIDYL-ALKANOLS AND THEIR ESTERS

Karl Hoffmann, Binningen, and Eugen Tagmann, Basel, Switzerland, assignors to Ciba Pharmaceutical Products, Inc., Summit, N. J.

No Drawing. Application August 22, 1950, Serial No. 180,896. In Switzerland September 9, 1949

8 Claims. (Cl. 260—296)

This invention relates to amino-aryl-pyridyl-alkanols of the formula

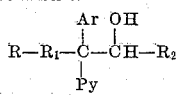

and their esters of lower aliphatic acids, as for example of acetic acid, propionic acid and butyric acid, in the form of the free bases or their acid salts, for example of the hydrohalic acids, sulphuric acid, nitric acid, phosphoric acid, acetic acid, propionic acid, oxalic acid, benzoic acid, salicylic acid, para-aminosalicylic acid, methane sulphonic acid and ethane sulphonic acid, etc. In the above formula, R indicates

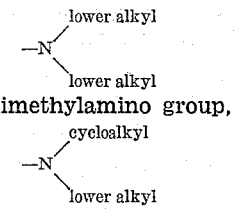

or —N=D, D representing the atoms necessary to complete an alkyleneimino group, for example a pyrrolidine or piperidine ring. $R_1$ represents a bivalent lower aliphatic hydrocarbon radical, such as an alkylene, for example the ethylene group. Ar stands for an aromatic radical, for example phenyl or a substituted phenyl such as halogenphenyl. Py stands for an unsubstituted or substituted pyridine radical, primarily the pyridyl-(2)-radical. $R_2$ represents a lower aliphatic, straight or branched hydrocarbon radical, such as the methyl, ethyl or propyl group.

The new compounds exhibit interesting pharmacological properties. Thus for example 1-dimethylamino - 3 - phenyl - 3 - pyridyl - (2') - hexanol-(4) and its esters, especially its propionic acid ester, have histaminolytic activity. They are therefore adapted for use as therapeutic agents.

The new alkanols of this invention are obtained by treating amino-aryl-pyridyl-alkanones of the formula

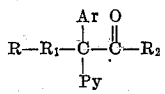

wherein R, $R_1$, Ar, Py and $R_2$ have the above significance, with reducing agents, if desired converting the alkanols formed into their esters, and further, if desired, producing from the compounds obtained their acid salts.

The alkanones specified as starting materials can be obtained for example by reaction of amino-aryl-pyridyl-alkane-carboxylic acid nitriles with Grignard compounds, as described for example in copending application, Ser. No. 180,702, filed August 21, 1950 (now U. S. Patent No. 2,585,550, granted February 12, 1952).

As reducing agents, use is made especially of dimetal hydrides, such as an alkali metal-aluminum hydride, in particular lithium-aluminum-hydride but also sodium- or lithium-boron-hydride. For the manufacture of the esters the alkanols can be reacted with acids or their reactive derivatives, such as anhydrides, halides or ketenes. It is also possible to proceed in such a manner that the alkanols are converted into their functional derivatives, as for example into their metal alcoholates, and then to allow acid derivatives, such as halides, to react on these alcoholates.

From the alkanols and their esters obtained according to the present process, their acid salts can be produced in the customary manner.

The following examples illustrate the invention, the relation between parts by weight and parts by volume being the same as that between the kilogram and the liter. The temperatures are in degrees centigrade.

Example 1

15.4 parts by weight of 1-dimethylamino-3-phenyl-3-pyridyl-(2')-hexanone-(4), dissolved in 100 parts by volume of absolute ether, are added in small portions with stirring to 2.1 parts by weight of lithium-aluminum-hydride suspended in 300 parts by volume of absolute ether. After the reaction has subsided, it is driven to completion by heating for 1 hour on the water bath under reflux. The reaction mixture is then decomposed with water, the ethereal solution separated and the aqueous solution exhaustively extracted with ether. The combined ethereal extracts are dried over potassium carbonate, the solvent evaporated off and the residue distilled under reduced pressure. The 1-dimethylamino-3-phenyl-3-pyridyl-(2')-hexanol-(4) of the formula

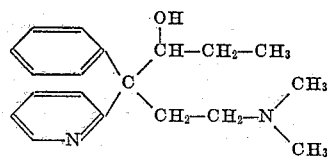

passes over as a yellow viscous oil between 106–114° under a pressure of 0.1 mm.

7.8 parts by weight of 1-dimethylamino-3-phenyl-3-pyridyl-(2')-hexanol-(4) are treated with 2.7 parts by weight of absolute pyridine and 3.8 parts by weight of propionic acid anhydride and maintained for 4 hours between 30–35°. After distilling off the excess of pyridine and the propionic acid anhydride, there is obtained the 1 - dimethylamino - 3 - phenyl - 3 - pyridyl-(2')-4-propionoxy-hexane of the formula

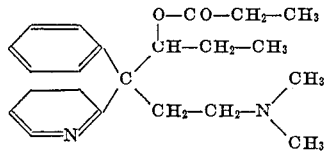

as an oil of boiling point 137–142° (0.2 mm.).

If, instead of the 3.8 parts by weight of propionic acid anhydride, 3.4 parts by weight of acetic acid anhydride or 4.2 parts by weight of butyric acid anhydride are used, there is obtained the 1-dimethylamino - 3 - phenyl-3-pyridyl-(2')-4-acetoxy-hexane of the formula

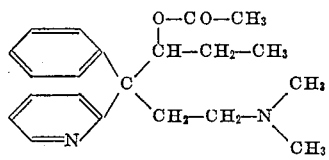

or the 1-dimethylamino-3-phenyl-3-pyridyl-(2')-4-butyryloxy-hexane of the formula

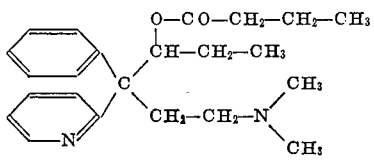

respectively.

The 1-dimethylamino-3-phenyl-3-pyridyl-(2')-hexanone-(4), employed as starting material, can be produced by reaction of α-phenyl-α-pyridyl-(2)-γ-dimethylamino-butyric acid nitrile with ethyl-magnesium-bromide.

*Example 2*

45.0 parts by weight of 1-(N-methyl-N-cyclopentyl - amino) - 3 - phenyl - 3 - pyridyl - (2') - heptanone-(4), dissolved in 100 parts by volume of absolute ether, are added in small portions with stirring to 4.2 parts by weight of lithium-aluminum-hydride, suspended in 400 parts by volume of absolute ether. When the exothermic reaction has subsided, the reaction mixture is finally heated for 30 minutes under reflux. By the same method of working up as described in Example 1, there is obtained the 1-(N-methyl-N - cyclopentyl - amino) - 3 - phenyl - 3 - pyridyl-(2')-heptanol-(4) of the formula

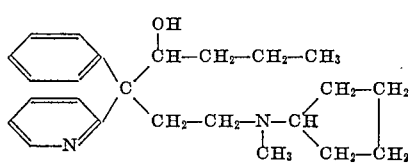

as a viscous oil of boiling point 168–180° (0.25 mm.).

31.0 parts by weight of 1-(N-methyl-N-cyclopentyl - amino) - 3 - phenyl - 3 - pyridyl - (2')-heptanol-(4) are dissolved in 20 parts by volume of absolute pyridine, 12.0 parts by weight of propionic acid anhydride added in portions and the reaction mixture allowed to stand for 6 hours at 45–50° with intermittent shaking. After distilling off the pyridine and the excess of propionic acid anhydride there is obtained the 1 - (N - methyl - N - cyclopentyl - amino) - 3 - phenyl - 3 - pyridyl - (2') - 4 - propionoxy - heptane of the formula

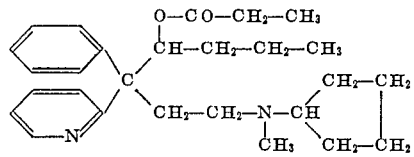

as an oil of boiling point 185–187° (0.1 mm.).

The 1 - (N - methyl - N-cyclopentyl-amino)-3-phenyl-3-pyridyl-(2')-heptanone-(4), employed as starting material in this example, is obtained by reaction of α-phenyl-α-pyridyl-(2)-γ-(N-methyl-N-cyclopentyl-amino)-butyric acid nitrile with n-propyl-magnesium-bromide.

In an analogous manner, there are obtained from 1 - (N - methyl - N - cyclohexyl-amino)-3-phenyl-3-pyridyl-(2')-heptanone-(4), the 1-(N-methyl - N - cyclohexyl - amino) - 3 - phenyl - 3-pyridyl-(2')-heptanol-(4) and its esters, for example, the propionic acid ester.

*Example 3*

33 parts by weight of 1-pyrrolidino-3-phenyl-3-pyridyl-(2')-hexanone-(4), dissolved in 100 parts by volume of absolute ether, are reduced with 2.1 parts by weight of lithium-aluminum-hydride, suspended in 400 parts by volume of absolute ether, in the same manner as in Examples 1 and 2. There is thus obtained the 1-pyrrolidino - 3 - phenyl - 3 - pyridyl - (2') - hexanol-(4) of the formula

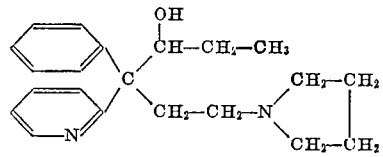

as an oil of boiling point 151–157° (0.25 mm.).

From 21.5 parts by weight of 1-pyrrolidino-3-phenyl-3-pyridyl-(2')-hexanol-(4), dissolved in 20 parts by volume of pyridine, there is obtained by reaction with 9.5 parts by weight of propionic acid anhydride by the method described in Examples 1 and 2, the 1-pyrrolidino-3-phenyl-3-pyridyl-(2')-4-propionoxy-hexane of the formula

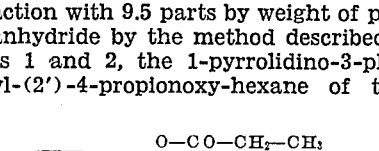

of boiling point 167–175° (0.25 mm.).

The 1 - pyrrolidino - 3-phenyl-3-pyridyl-(2')-hexanone-(4) can be produced by the same methods as described in Examples 1 and 2 from α - phenyl - α - pyridyl - (2) - γ - pyrrolidino - butyric acid nitrile by reaction with ethyl-magnesium-bromide.

*Example 4*

From 33.3 parts by weight of 1-dimethylamino-3-phenyl-3-pyridyl-(2')-5-methyl-hexanone-(4), dissolved in 100 parts by volume of absolute ether, there is obtained by hydrogenation with 2.5 parts by weight of lithium-aluminum-hydride, suspended in 500 parts by volume of absolute ether, the 1-dimethylamino-3-phenyl-3-pyridyl-(2')-5-methyl-hexanol-(4) of the formula

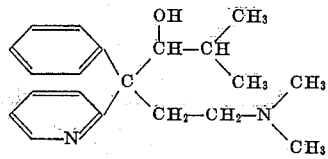

of boiling point 132–136° (0.25 mm.).

From 24.0 parts by weight of 1-dimethylamino-3 - phenyl-3-pyridyl-(2')-5-methyl-hexanol-(4), dissolved in 20 parts by volume of pyridine, there is obtained by reaction with 14.0 parts by weight of propionic acid anhydride in the same manner as described in Examples 1–3, the 1-dimethyl-amino-3-phenyl-3-pyridyl-(2')-4-propionoxy-5-methyl-hexane of the formula

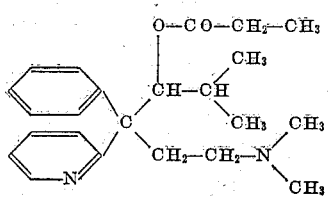

of boiling point 142–150° (0.25 mm.).

The 1-dimethylamino-3-phenyl-3-pyridyl-(2')-5-methyl-hexanone-(4), employed as starting material for this example, is produced by reaction of α-phenyl-α-pyridyl-(2)-γ-dimethylamino-butyric acid nitrile with isopropyl-magnesium-bromide.

Example 5

16.4 parts by weight of 1-diethylamino-3-phenyl-3-pyridyl-(2')-hexanone-(4), dissolved in 100 parts by volume of absolute ether, are reduced with 2.1 parts by weight of lithium-aluminum-hydride, suspended in 400 parts by volume of absolute ether, by the method of the preceding examples. There is thus obtained the 1-diethyl-amino-3-phenyl-3-pyridyl-(2')-hexanol - (4) of the formula

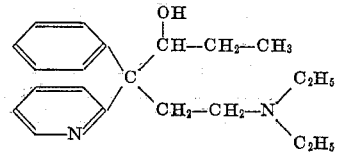

in the form of a viscous oil of boiling point 128–134° under 0.2 mm. pressure.

By reacting 1-diethylamino-3-phenyl-3-pyridyl-(2')-hexanol-(4) with acetic anhydride in the presence of pyridine, in analogy to the method described in the preceding examples, there is obtained the 1-diethylamino-3-phenyl-3-pyridyl-(2')-acetoxy-hexane of the formula

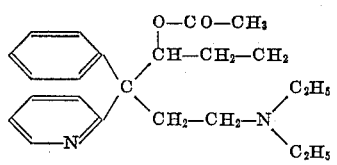

in the form of a thickly fluid oil of boiling point 142–148° under 0.15 mm. pressure.

The 1-diethylamino-3-phenyl-3-pyridyl-(2')-hexanone-(4) can be prepared, the same as in the foregoing examples, by reacting α-phenyl-α-pyridyl-(2)-γ-diethylamino-butyric acid nitrile with ethyl-magnesium bromide.

Example 6

19.2 parts by weight of 1-piperidino-4-phenyl-4-pyridyl-(2')-heptanone-(5), dissolved in 150 parts by volume of dry ether, are reduced with 2.1 parts by weight of lithium-aluminum-hydride in the manner indicated in examples 1–5, to obtain 1-piperidino-4-phenyl-4-pyridyl-(2')-heptanol-(5) of the formula

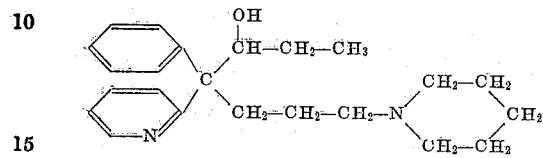

which boils at 166–172° under 0.25 mm. pressure.

By the action of acetic anhydride in the presence of pyridine there is obtained therefrom the 1 - piperidino - 4 - phenyl-4-pyridyl-(2')-5-acet-oxy-heptane of the formula

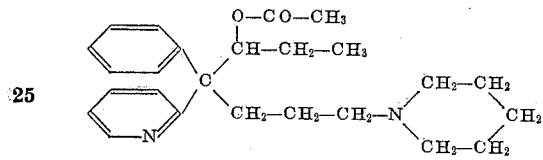

which boils at 182–184° under 0.25 mm. pressure.

The 1-piperidino-4-phenyl-4-pyridyl-(2')-heptanone-(5) used as starting material in this example can be produced from α-phenyl-α-pyridyl-(2)-δ-piperidinovaleric acid nitrile by reaction with ethyl-magnesium-bromide in analogy to the preceding examples.

Example 7

14.2 parts by weight of 1-dimethylamino-3-(para - chloro-phenyl)-3-pyridyl-(2')-hexanone-(4), dissolved in 100 parts by volume of absolute ether, are added in small portions while stirring to 1.0 part by weight of lithium-aluminum-hydride, suspended in 400 parts by volume of absolute ether. When the addition is complete and the reaction has subsided, the reaction mass is refluxed on the water bath for one hour, then any remaining excess of lithium-aluminum-hydride carefully destroyed with water, the ethereal solution removed and the aqueous solution completely extracted with ether. The combined ethereal extracts are dried over potassium carbonate, the solvent is evaporated and the residue distilled under reduced pressure. The 1-dimethylamino-3-(para - chloro - phenyl)-3-pyridyl-(2')-hexanol-(4) of the formula

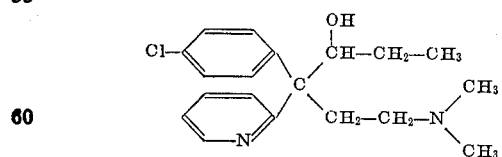

boils at 168–172° under 0.3 mm. pressure.

8.9 parts by weight of 1-dimethylamino-3-(para - chloro - phenyl)-3-pyridyl-(2')-hexanol-(4) are dissolved in 10 parts by volume of absolute pyridine and, while cooling externally, 4.0 parts by weight of acetic anhydride added in portions. When the reaction has subsided, the reaction mixture is maintained at 70° for 2 hours, then the excess pyridine and any acetic anhydride that may still be present are removed by evaporation under reduced pressure, and the residue is distilled under reduced pressure. The resultant 1 - dimethylamino - 3 - (para - chloro-phenyl)-3-pyridyl-(2')-4-acetoxy-hexane of the formula

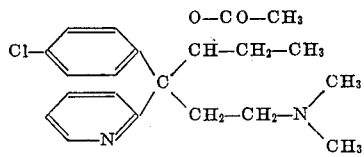

boils at 179–190° under 0.3 mm. pressure.

The 1-dimethylamino-3-(para-chloro-phenyl)-3-pyridyl-(2')-hexanone-(4) used as starting material can be prepared by reacting α-(para-chloro - phenyl) - α - pyridyl - (2) - γ - dimethylamino-butyric acid nitrile with ethyl-magnesium bromide.

By starting from 2-dimethylamino-4-(para-chloro - phenyl) - 4 - pyridyl - (2') - heptanone-(5) there may be obtained in analogous manner the 2-dimethylamino-4-(para-chloro-phenyl)-4-pyridyl-(2')-5-acetoxy-heptane of the formula

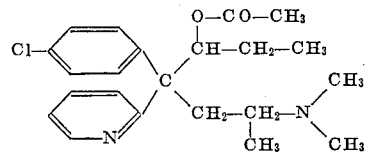

From the alcohols and esters, described in the foregoing examples, the hydrochlorides are obtained by reaction with hydrochloric acid, for example dissolved in ethyl acetate. They constitute crystalline compounds easily soluble in water. In analogous manner also other aforementioned salts are obtained as for example sulphates and phosphates.

What is claimed is:

1. A member selected from the group consisting of the esters of lower fatty acids of the amino-aryl-pyridyl-alkanols of the formula

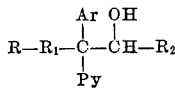

and the acid addition salts thereof, wherein R stands for a member selected from the group consisting of the

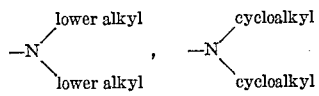

groups, $R_1$ stands for a lower alkylene group, Ar represents an aryl radical, Py stands for a pyridine radical, and $R_2$ represents a lower alkyl group.

2. A lower fatty acid ester of a dimethylamino-aryl-pyridyl-alkanol of the formula

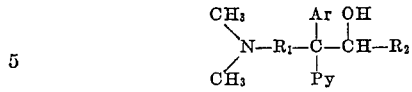

wherein $R_1$ stands for a lower alkylene group, Ar stands for an aryl radical, Py stands for a pyridine radical, and $R_2$ represents a lower alkyl group.

3. An acid addition salt of a lower fatty acid ester of a dimethylamino-aryl-pyridyl-alkanol of the formula

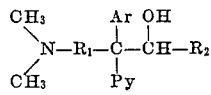

wherein $R_1$ stands for a lower alkylene group, Ar stands for an aryl radical, Py stands for a pyridine radical, and $R_2$ represents a lower alkyl group.

4. A lower fatty acid ester of 1-dimethylamino-3-phenyl-3-pyridyl-(2')-hexanol-(4).

5. An acid addition salt of a lower fatty acid ester of 1-dimethylamino-3-phenyl-3-pyridyl-(2')-hexanol-(4).

6. An acid addition salt of 1-dimethylamino-3 - phenyl - 3 - pyridyl - (2') - 4 - propionoxy-hexane.

7. 1 - dimethylamino - 3 - (para - halogen-phenyl)-3-pyridyl-(2')-4-acetoxy-hexane.

8. An acid addition salt of 1-dimethylamino-3 - (para - halogen - phenyl) - 3 - pyridyl - (2') - 4-acetoxy-hexane.

KARL HOFFMANN.
EUGEN TAGMANN.

REFERENCES CITED

The following references are of record in the file of this patent:

UNITED STATES PATENTS

| Number | Name | Date |
|---|---|---|
| 2,411,664 | Miescher et al. | Nov. 26, 1946 |
| 2,542,466 | Blicke | Feb. 20, 1951 |

FOREIGN PATENTS

| Number | Country | Date |
|---|---|---|
| 11,197 | Great Britain | of 1906 |
| 884,740 | France | Aug. 25, 1943 |
| 589,625 | Great Britain | June 25, 1947 |

OTHER REFERENCES

Speeter et al.: J. Am. Chem. Soc., vol 71, p. 57 (1949).